Patented Apr. 7, 1953

2,634,237

UNITED STATES PATENT OFFICE 2,634,237

RUST INHIBITING COMPOSITION

Warren John Kopf and Laurence Clayton Westcott, Alton, Ill., assignors to Shell Development Company, San Francisco, Calif., a corporation of Delaware No Drawing. Application April 15, 1949, Serial No. 87,834

5 Claims. (Cl. 252—37.5)

This invention relates to an all purpose corrosion and rust inhibiting composition. More particularly, this invention pertains to corrosion inhibiting compositions having the ability of displacing moisture, corrosive materials and the like from metal surfaces and forming thereon a tenacious protective film, which is impervious to moisture and other contaminants.

It is well known that moisture, corrosive fluids and gases, e. g. $H_2S$, $SO_2$, etc., readily attack not only metallic surfaces but non-metallic surfaces and cause corrosion, rusting, pitting and other damages to such surfaces. Also aqueous solutions when in contact with a metallic surface readily attack it and cause corrosion and rusting. Under certain conditions the problem of corrosion becomes exceedingly serious because once started it becomes progressively accelerated. Thus, oils containing small amounts of water become very corrosive to contacting metals. This is due to that fact that oils and particularly liquid petroleum hydrocarbons are relatively good solubilizers of oxygen and any moisture therein becomes surrounded by an almost inexhaustible store of oxygen. Moisture under such conditions is inhibited from evaporating and since the rate of transfer of oxygen from hydrocarbons, such as mineral oil or gasoline, to water is unlimited, ideal conditions for rusting and corrosion are set up. The presence of electrolytes and formation of corrosive decomposition products in oils and the like also greatly increase the rate of corrosivity.

Under conditions where, in addition to those enumerated, elevated temperature is encountered, corrosion activity is greatly accelerated. Thus, moisture, salt sprays and other contaminants or acidic composition products and corrosive gases formed during operation of engines, such as internal combustion engines, diesel engines, aircraft engines, turbines and various other machinery and industrial equipment, readily attack and rust or corrode contacting metal surfaces. The damage thus caused is not to the metal surface alone for rust particles frequently break off and enter the circulating system of engines and cause plugging, clogging, and fouling of conduit lines, columns, plates, and the lines of cracking equipment, tubes, evaporators, etc.

Corrosion of alloy bearings and other alloy surfaces due to contact with water can attain such an aggravated stage as to cause great fatigue stresses to be set up, which ultimately results in cracking of the metal.

The problem is equally serious when combating rusting and corrosion of steel drums, storage tanks used to store gasoline, hydrocarbon oils and the like. Moisture adhering to pickled steel, quenched steel, equipment such as instruments, engine starters and generators on landing crafts, hydraulic systems, machinery for metal processing and the like are also extremely susceptible to corrosion and must be protected. The problem is particularly serious when metallic parts, machines, e. g. aircrafts and the like are transported over bodies of salt water over long periods of time under humid and high temperature conditions. Unless the metal surfaces are protected with a coating composition which is impervious to active corrosion producing agents, serious and damaging corrosion sets in.

Such contaminants also have a detrimental effect upon the medium in which they are dispersed. In lubricating and liquid fuel media they cause oxidation, interfere with the functioning of additives or decrease their efficiency, form emulsions and thickening of the fluid and generally cause gumming and sticking of movable parts.

A particular situation where corrosion due to deterioration of a lubricant due to oxidation and the presence of water can be found in turbine oil lubrication. Turbine lubricants require that the base oil be highly refined and this, although it improves the lubricant in some respects, unfortunately tends to remove natural oxidation inhibitors from the oil. Similar problems arise in connection with damping or hydraulic oils, transformer or electrical insulating oils, refrigerator oils, etc.

It has now been discovered that various metal surfaces, such as engine parts or any surface requiring good lubrication and protection against rusting and corrosion, can be so lubricated and protected by contacting said surfaces with an oleaginous vehicle having incorporated therein minor amounts of two primary type of additives, the combination of which produces a synergistic action, which if desired may be further improved by addition of a secondary additive; said composition having outstanding properties as regards lubricity, oxidation stability, corrosion and rust inhibiting properties as well as many other desirable properties which are desirable in a good lubricant and corrosion inhibiting composition.

Specifically, it has been found that an outstanding rust-inhibiting composition having excellent lubricating properties is obtained when an oleaginous vehicle is blended with minor amounts of a lead salt of an organic cyclic acid and a monoester of a polyhydric alcohol, with or without the presence of an alkyl substituted aromatic compound containing at least one polar group, as will be hereinafter more fully described, or other type organic additives.

Cyclic acids which may be used to form lead salts may be represented by the formula

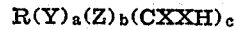

wherein R is a cyclic radical, the X's may be

O, S, Se and/or Te; the acid radical (CXXH) being linked directly or indirectly to R; Y is a polar group; Z is an organic radical from the groups consisting of alkyl, alkylene, alkylaryl, aryl alkyl, alkoxy, aroxyl, aryl radical and the like; $a$ and $b$ may be zero or an integer of 1 or 2, and $c$ is an integer of 1 or 2. The substituent group represented by Y in the formula may be hydroxy, amine, nitro, nitroso, halogen, sulfo, mercapto, and the like. The polar group or groups may be attached directly or indirectly to the R radical.

Specifically cyclic acids may include: naphthenic acid (derived from petroleum hydrocarbons), phenyl naphthenic acids, hydroxyphenyl naphthenic acids, benzyl naphthenic acids, benzoyl naphthenic acids, naphthyl naphthenic acids, xenyl naphthenic acids, phenyl vinaconic acid, phenyl caronic acid, truxilic acids, phenyl morphinic acid, phenyl-binic acid, phenyl camphoric acid, phenyl camphenic acid, phenyl 2,3,4-trimethyl cyclopentane-3 carboxylic acid, phenyl hexadrobenzoic acids, hydrophenyl hexahydrobenzoic acids, benzoyl hexahydrobenzoic acids, naphthyl hexahydrobenzoic acids, phenyl hexahydrophthalic acids, phenyl quinic acid, hexahydrobenzoic acid, tetrahydrophthalic acid, hexahydrophthalic acid, tetrahydrotoluic acid, alkyl hexahydrophthalic acid, alkylene cyclohexadiene carboxylic acid, cyclohexane carboxylic acid, cyclohexylacetic acid, cyclohexylbutynic acid, cyclohexyl caproic acid, cyclohexylpropionic acid, cyclohexylvaleric acid, fencholic acid, cholic acid, abietic acid, etc.

Some of the lead salts which are specifically preferred are the lead salts of petroleum naphthenic acid, phenyl naphthenic acid, hydroxy phenyl naphthenic acid, naphthyl naphthenic acid, phenyl hexahydrobenzoic acid, cyclohexadiene carboxylic acid, cyclohexyl caproic acid, abietic acid and mixtures thereof.

The other primary additive is a monoester of a polyhydric alcohol. The corrosion inhibiting ester alcohols should contain not less than two free OH radicals separated by not more than three intervening atoms. Preferably at least one hydroxyl radical is on a terminal carbon atom but it may be removed from such terminal carbon atom by as many as two, three or four atoms. Additional OH radicals may be located near the first hydroxyl groups. To this alcoholic portion of the molecule there is attached a predominantly hydrocarbon portion containing a number of carbon atoms sufficient to give the molecule a total minimum carbon content of about 12 and preferably about 15 to 46 carbon atoms. This hydrocarbon portion is attached to the alcoholic portion of the molecule through an ester linkage which may be formed between the hydroxyl or an acid radical (if there is one) of the polyhydric alcohol on the one hand, and an acid or alcohol respectively on the other. It is desirable that the hydroxyl radicals and ester linkages of the ester alcohol be as close together as possible, at least two hydroxyl radicals being separated from each other by not more than three directly connected atoms.

It will be seen that the ester alcohols may be derivatives of glycerol, erythritol, pentaerythritol, mannitol, sorbitol, sorbitan, etc. The acid forming the ester with the polyhydric alcohol should have at least about 8 and preferably between about 10 and 40, carbon atoms, in the form of an aliphatic or cyclo aliphatic radical.

Suitable radicals comprise, for example, capryl, decyl, citronellyl, undecyl, undecylenyl, lauryl (dodecyl), tridecyl, myristyl (tetradecyl), myristolenyl, pentadecyl, palmityl (hexadecyl), hypogaeyl, palmitolenyl, therapinyl, oleyl, elaidyl, erucyl, stearyl, abietyl, etc. Radicals such as are contained in the acids obtained from rosin or tall oil as well as in naphthenic (i. e. cycloaliphatic) acids having the requisite number of carbon atoms are also applicable.

The acid which may form the ester with the polyhydric alcohol is preferably a carboxylic acid, although sulfonic, alkyl sulfuric, phosphonic, alkyl phosphoric, etc., acids are also useful. Specific monoesters are: glyceryl monooleate, glyceryl monostearate, sorbitan monooleate, sorbitan monostearate, glyceryl monoricinoleate, glyceryl mononaphthenate, mannitan monolaurate, mannitan monooleate, pentaerythritol monooleate, pentaerythritol monostearate, pentaerythritol monocaprylate, polyoxyethylene sorbitan monostearate, polyoxyethylene sorbitan monooleate, glycerol monoester of soya bean fatty acids, etc. If desired, mixtures of these esters may be used or the esters may be modified by hydrogenation, chlorination, and/or phosphorization.

As stated previously in addition to the above primary additives a secondary additive may be used such as non-metallic, relatively non-polar organic lubricant improving agents, if desired. This secondary additive may be a substituted aromatic compound represented by the general formula:

$(R'')_y$—Ar—$(YH)_x$ wherein Ar is a mono or poly nuclear aromatic ring compound, R'' represents alkyl, including alkenyl, aroxy, and/or alkoxy radicals, one of which should contain at least 4 carbon atoms, Y is an element from the group consisting of O, S, Se, and Te, $x$ is an integer of 1 to 2 and $y$ is a small integer of at least 1, preferably from 1 to 4, and selected so that $x$ plus $y$ is not greater than 6 when Ar is a mono nuclear ring. If $x$ is greater than one, then the radicals YH may be the same or different.

The alkyl phenols should preferably contain no additional water-solubilizing groups. The alkyl phenols can be made by alkylation of a phenol by well known suitable means. Alkenes and their mixtures containing from 10 to 18 carbon atoms in the molecule can be used as the alkylating material. Here again mixtures of alkenes derived from paraffin waxes by cracking or from higher fatty alcohols by dehydration are valuable and easily accessible starting materials. Thus, a mixture of alkyl phenols made by the alkylation of phenol or lower alkyl phenols such as the cresols and xylenols, or alpha, or beta-naphthol with a mixture of alkenes containing from 4 to 18 carbon atoms in the molecule and obtained by the above-mentioned procedure can be employed. More than one alkyl group may be present in the phenol as in the case of compounds made by the di- or tri-alkylation of phenols with alkenes or alkyl halides or alcohols or ethers or of compounds made by the monoalkylation of, for example, a cresol, a xylenol, or carvacrol. Other nuclear substitutents may be present provided they do not increase substantially the water solubility of the product. Thus, halogen, alkoxy, alkyl mercapto, and alkyl amino groups may be present in the phenol. Moreover di- or polyhydric phenols, such as catechol, resorcinol, pyrogallol, and the dihydroxy naphthalenes may be alkylated to produce water-insoluble and oil-soluble phenols useful for the purposes of this invention.

Specific compounds which are represented by the above general formula and which can be used in compositions of this invention are:

2,4-dimethyl-6-tertiary octyl phenol
2,4-dibutyl-6-tertiary octyl phenol
2,4-dioctyl-6-methyl phenol
2-ethyl-4-octyl phenol
1,4-dihydroxy-2(2-octyl) benzene
2,4-dimethyl-6-tertiary octyl alpha-naphthol
2,4-dioctyl-6-butyl alpha-naphthol
2,4-dioctyl alpha-naphthol
2,4-dimethyl-6-tert-octyl thiophenol
2,4-dimethyl-6-tert-octyl seleno-phenol
1,4-dimercapto-2(2-octyl) benzene
1-mercapto-4-hydroxy-2-octyl benzene
2-ethyl-4-octyl thiophenol
2,4-dioctyl-6-methyl alpha-thionaphthol
2,4-dimethyl-6-octyl alpha-thionaphthol
2,4-dimethyl-6-tert octyl telluro phenol
$C_{14}$-alkylated cardanol
$C_{14}$-alkylated thiocardanol
Paratertiary octyl phenol
Paratertiary nonyl phenol
Ortho dodecyl phenol
Para dodecyl phenol
Di-tert-butyl-p-cresol Other oil improving additives which may be used are oil-soluble dibasic acids, e. g. alkenyl succinic and malonic acids, and/or organic amines, e. g. phenyl - alpha - naphthylamine, naphthylamine, dinaphthylamine, aminophenol, etc.

The oleaginous vehicle or base for additives of this invention can be any natural or synthetic material having some lubricating properties. Thus, the base may be a hydrocarbon oil obtained from a paraffinic, naphthenic, Mid-Continent or Coastal stock and/or mixtures thereof. The viscosity of these oils may vary over a wide range such as from 100 SUS at 100° F. to 100 SUS at 210° F. The hydrocarbon oils may be blended with fixed oils such as castor oil, lard oil and the like and/or with synthetic lubricants such as polymerized olefins, copolymers of alkylene glycols and alkylene oxides, organic esters, e. g. 2-ethyl hexyl sebacate, dioctyl phthalate, trioctyl phosphate; polymeric tetrahydrofuran, polyalkyl silicone polymers, e. g. dimethyl silicone polymer and the like. If desired the synthetic lubricants may be used as the sole base lubricant or admixed with fixed oils and derivatives thereof.

The general formulation of compositions of this invention may be represented by:

|  | Broad Range | Limited Range |
|---|---|---|
| Primary—Lead salt of an organic cyclic acid | 0.001 to 2% | 0.01 to 0.5%. |
| Primary—Monoester of a polyhydric alcohol | 0.01 to 5% | 0.01 to 1%. |
| Secondary—Alkyl aromatic compound containing at least one polar radical | 0 to 7% | 0.01 to 2%. |
| Optional— Organic compounds having rust inhibiting, oiliness oxidation, stabilizing or EP properties | 0 to 2% | 0.01 to 0.5%. |
| Base hydrocarbon oil and/or synthetic oil | balance | balance. |

A preferred composition of this invention may be illustrated by the following examples:

Lead naphthenate _____ 0.001 to 0.3%
Pentaerythritol monooleate _____ 0.01 to 0.3%
Di-t-butyl-p-cresol _____ 0 to 1.0%
Mineral oil _____ Balance The following table further illustrates specific compositions of this invention, each component of which may be used in amounts as indicated in the above examples.

| Components | 1 | 2 | 3 | 4 | 5 | 6 | 7 | 8 | 9 | 10 |
|---|---|---|---|---|---|---|---|---|---|---|
| Primary Additives: | | | | | | | | | | |
| pentaerythritol monooleate | x | | x | | | | x | | | x |
| pentaerythritol monostearate | | x | | | | | | | | |
| pentaerythritol monocaprylate | | | | x | | | | | | |
| glyceryl monooleate | | | | | x | | | | | |
| sorbitan monooleate | | | | | | | | x | | |
| sorbitan monolaurate | | | | | | | | | x | |
| mannitol monolaurate | | | | | | x | | | | |
| lead naphthenate | x | x | x | | x | | x | x | | x |
| lead abietate | | | | x | | x | | | x | |
| Secondary Additives: | | | | | | | | | | |
| Di-t-butyl-p-cresol | | | | x | | | | | x | x |
| p-nonyl thiophenol | x | | | | | | | | | |
| octyl naphthol | | | | | | | | x | | |
| Optional Additives: | | | | | | | | | | |
| Zn diisopropyl salicylate | | | x | | | | | | | x |
| oleic acid | | | | | | | | | x | |
| phenyl-alpha-nathylamine | | | | | | | | x | | |
| $C_{10}$-$C_{20}$ alkenyl succinic acid | | | | | | | x | | | |

The above compositions can be added to any suitable mineral oil, preferably of lubricating viscosity or they can be admixed or blended with mixtures of mineral oils and/or synthetic oils or fixed oils and their derivatives or a synthetic oil can be used as the base.

In order to illustrate the marked rust inhibiting properties compositions of this invention possess, the following composition of this invention was compared with well known rust inhibiting compositions in the Navy Rust Test modified to correspond to the ASTM Test D-665-47T, Procedure B and the results were as follows:

*Composition*

| Composition | Result of Navy Rust Test |
|---|---|
| I. {0.03% pentaerythritol monooleate / 0.03% Pb naphthenate / 0.25% di-t-butyl-p-cresol / Balance (mineral oil, 150 Turbo raffinate)} | passed. |
| II. {0.03% pentaerythritol monooleate / 0.03% Pb naphthenate / Mineral oil (balance)} | Do. |
| III. {0.03% pentaerythritol monooleate / 0.02% Zn naphthenate / 0.25% di-t-butyl-p-cresol / Mineral oil (balance)} | failed. |
| IV. {0.05 pentaerythritol monooleate / 0.25% di-t-butyl-p-cresol / Balance (mineral oil)} | Do. |
| V. {0.03% pentaerythritol monooleate / Mineral oil (balance)} | Do. |
| VI. {0.05% Pb naphthenate / 0.25% di-t-butyl-p-cresol / Balance (mineral oil)} | Do. |

Compositions of this invention were also subjected to the Turbine Oil Stability Test and the results were as follows:

| Composition | First Rusting Observed | Oil Life (Hrs.) |
|---|---|---|
| Mineral oil | Rusted in less than 24 hrs. | 100 |
| VII. {0.50% purified di-t-butyl-p-cresol / 0.02% pentaerythritol monooleate / 0.02% Pb naphthenate / Balance (mineral oil)} | No rusting (1,600 hrs.) | 1,600 |
| VIII. {0.03% pentaerythritol monooleate / Balance (mineral oil)} | Rust noted at 48 hrs. | 800 |

In some instances it may also be advantageous to incorporate an additional antioxidant in about the same proportions as the polyalkyl phenol compound. The function of this supplemental antioxidant or third additive is to reinforce the primary antioxidant. This is desirable because different types of antioxidants seem to exhibit a maximum effectiveness in the presence of particular metal surfaces or metallic oxidation catalysts and a minimum effectiveness with other metals. Hence when several different metals are in contact with the lubricant, it is well to have antioxidants which are particularly effective toward two or more types of metals.

The compounded lubricating oil may also contain other additives like additional corrosion inhibitors, such as sulfonic or fatty acids and their salts, extreme pressure compounds such as alkyl phosphates, friction reducing compounds such as allophanates, interfacial tension modifiers or foam reducing agents, blooming agents, soap thickeners to form grease, viscosity regulators such as acryloid polymers, detergents, etc.

Detergents may be formed from the oil-soluble salts of various bases with detergent forming acids. Such bases include metallic as well as organic bases. Metallic bases include those of the alkali metals, as well as Cu, Mg, Ca, Sr, Ba, Zn, Cd, Al, Sn, Pb, Cr, Mn, Fe, Ni, Co, etc. Organic bases include various nitrogen bases as primary, secondary, tertiary and quaternary ammonium bases.

Examples of detergent forming acids are the various fatty acids of, say, 10 to 30 carbon atoms, wool fat acids, paraffin wax acids (produced by oxidation of paraffin wax), chlorinated fatty acids, aromatic carboxylic acids including aryl fatty acids, aryl hydroxy fatty acids, paraffin wax benzoic acids, various alkyl salicylic acids, phthalic acid mono esters, aromatic keto acids, aromatic ether acids; diphenols as di(alkyl phenol) sulfides and disulfides, methylene bis-alkyl-phenols; sulfonic acids such as may be produced by treatment of alkyl aromatic hydrocarbons or high boiling petroleum oils with sulfuric acid; sulfuric acid mono esters; phosphoric acid mono and di-esters, including the corresponding thio-phosphoric acids, phosphonic and arsonic acids, etc.

Non-metallic detergents include compounds such as the phosphatides (e. g. lecithin), certain fatty oils as rapeseed oils, volatilized fatty or mineral oils.

Other detergents are the alkaline earth phosphate di-esters, including the thiophosphate di-esters, the alkaline earth diphenolates, specifically the calcium and barium salts of diphenol mono- and polysulfides; etc.

Particularly effective detergents are the polyvalent metal salts of the resinous condensation products of low molecular weight aldehydes (such as HCHO, CH₃CHO, etc.) with alkylated aryl hydroxy products (such as alkyl phenol, alkyl naphthol, etc.). They may be typified by the calcium salt of the reaction product of formaldehyde and iso-octyl phenol

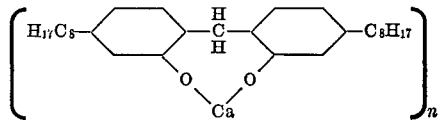

wherein $n$ is a small integer such as 2, 3 or 4 or the product is a mixture of such polymers.

Detergents are employed in such proportions as to have no adverse effect upon the functioning of the primary additives of this invention. Generally, if used, these additives should not exceed 5% by weight of the composition and preferably should be present in amount less than the total amount of the primary additives used.

We claim as our invention:

1. A rust inhibiting composition comprising a mineral oil having incorporated therein about 0.03% of pentaerythritol monooleate and about 0.03% lead naphthenate.

2. A rust inhibiting composition comprising a mineral oil having incorporated therein about 0.03% of pentaerythritol monooleate, 0.03% lead naphthenate and about 0.25% di-tert-butyl-p-cresol.

3. A rust inhibiting composition containing the following constituents in the following proportions:

| | Per cent by weight |
|---|---|
| Pb naphthenate | 0.001–2% |
| Pentaerythritol monooleate | 0.01–5% |
| Di-tert-butyl-p-cresol | 0.01–7% |
| Mineral oil | Balance |

4. A rust inhibiting composition containing the following constituents in the following proportions:

| | Per cent by weight |
|---|---|
| Pb naphthenate | 0.001–2% |
| Pentaerythritol monooleate | 0.01–5% |
| Mineral oil | Balance |

5. A rust-inhibiting composition comprising a mineral oil having incorporated therein from 0.001% to 2% of lead naphthenate and from 0.01% to 5% of pentaerythritol monooleate.

WARREN JOHN KOPF.
LAURENCE CLAYTON WESTCOTT.

REFERENCES CITED

The following references are of record in the file of this patent:

UNITED STATES PATENTS

| Number | Name | Date |
|---|---|---|
| 2,151,285 | Toussaint | Mar. 21, 1939 |
| 2,371,333 | Johnston et al. | Mar. 13, 1945 |
| 2,398,193 | Sharp | Apr. 9, 1946 |
| 2,415,353 | Johnston et al. | Feb. 4, 1947 |
| 2,448,567 | Zisman et al. | Sept. 7, 1948 |
| 2,479,424 | Sproule et al. | Aug. 16, 1949 |